(12) United States Patent
Dinkel et al.

(10) Patent No.: US 6,200,109 B1
(45) Date of Patent: Mar. 13, 2001

(54) ELECTROMOTOR/PUMP ASSEMBLY

(75) Inventors: Dieter Dinkel, Eppstein; Hans-Dieter Reinartz, Frankfurt; Stephan Risch, Weiterstadt, all of (DE)

(73) Assignee: Continental Teves AG & Co., OHG (DE)

( * ) Notice: Subject to any disclaimer, the term of this patent is extended or adjusted under 35 U.S.C. 154(b) by 0 days.

(21) Appl. No.: 09/242,481

(22) PCT Filed: Jul. 25, 1997

(86) PCT No.: PCT/EP97/04044

§ 371 Date: Dec. 17, 1999

§ 102(e) Date: Dec. 17, 1999

(87) PCT Pub. No.: WO98/07986

PCT Pub. Date: Feb. 26, 1998

(30) Foreign Application Priority Data

Aug. 17, 1996 (DE) .............................................. 196 33 170

(51) Int. Cl.[7] .............................. F04B 17/00; F04B 35/04
(52) U.S. Cl. ............................................. 417/415; 417/273
(58) Field of Search ................... 137/625.21; 310/88; 417/410, 366, 521, 271, 273, 415, 486; 418/33, 141; 384/100; 92/72; 277/42

(56) References Cited

U.S. PATENT DOCUMENTS 3,584,648 * 6/1971 Lubos ................. 137/625.1
3,639,085 * 2/1972 Bertsch et al. ........... 417/410

(List continued on next page.)

FOREIGN PATENT DOCUMENTS

| 9 23 589 | 5/1951 | (DE) . |
| 23 62 795 | 6/1975 | (DE) . |
| 24 33 045 | 1/1976 | (DE) . |
| 26 16 437 | 10/1977 | (DE) . |
| 37 09 495 | 10/1987 | (DE) . |
| 37 22 988 | 1/1989 | (DE) . |
| 39 41 442 | 7/1990 | (DE) . |
| 42 35 962 | 5/1994 | (DE) . |
| 44 23 531 | 1/1995 | (DE) . |
| 44 19 927 | 12/1995 | (DE) . |
| 44 33 970 | 3/1996 | (DE) . |
| 0 256 389 | 2/1988 | (EP) . |
| 02 76 623 | 8/1988 | (EP) . |
| 0 682 398 | 11/1995 | (EP) . |
| 93 00 513 | 1/1993 | (WO) . |

OTHER PUBLICATIONS

Search Report of th Geman Patent Office for German Appl. No. 196 33 170.6.

*Primary Examiner*—Teresa Walberg
*Assistant Examiner*—Leonid Fastovsky
(74) *Attorney, Agent, or Firm*—Rader, Fishman & Grauer PLLC

(57) ABSTRACT

The present invention discloses an electric-motor-and-pump assembly including an electric motor, and the pump-sided end of the motor shaft (3) extends through a housing lid (10), is supported with at least one roller bearing (13) on a pump housing (2), and its purpose is to drive pump pistons (17, 18). The housing lid (10) includes a bore in the area of a shaft passage (9) which leaves open a gap (11) to the motor shaft (3). The gap (11) connects a pump-sided crank chamber (14) to an inside space (19) of the motor. The assembly includes a sealing element (20) which shuts off the gap (11).

16 Claims, 4 Drawing Sheets

U.S. PATENT DOCUMENTS

| | | | | |
|---|---|---|---|---|
| 3,658,447 | * | 4/1972 | Bancroft | 418/33 |
| 3,992,133 | * | 11/1976 | Brunner | 417/366 |
| 4,173,437 | * | 11/1979 | Leka et al. | 417/521 |
| 4,336,473 | * | 6/1982 | Wetters et al. | 310/88 |
| 4,516,921 | * | 5/1985 | Kemp | 418/141 |
| 4,594,056 | * | 6/1986 | Brunner | 417/271 |
| 4,634,297 | * | 1/1987 | Schriwer | 384/100 |
| 5,127,316 | * | 7/1992 | Ishiwata et al. | 92/72 |
| 5,167,493 | * | 12/1992 | Kobari | 417/273 |
| 5,261,676 | * | 11/1993 | Rockwood | 277/42 |
| 5,360,322 | | 11/1994 | Henein et al. | |
| 5,484,270 | * | 1/1996 | Adahan | 417/415 |
| 5,620,311 | * | 4/1997 | Wetzel | 417/415 |
| 5,626,466 | * | 5/1997 | Ruoff et al. | 417/273 |
| 5,769,616 | * | 6/1998 | Mencarelli et al. | 417/486 |
| 6,071,086 | * | 6/2000 | Thoma | 417/273 |

* cited by examiner

ELECTROMOTOR/PUMP ASSEMBLY

BACKGROUND OF THE INVENTION

The present invention relates to an electric-motor-and-pump assembly including an electric motor having a pump-sided shaft end which extends through a housing lid, is supported with at least one roller bearing on a pump housing, and whose purpose is to drive pump pistons, wherein the housing lid in the area of the shaft passage leaves open a gap which connects a pump-sided crank chamber to an inside space of the motor.

DE-OS 43 15 826 discloses an electric-motor-and-pump assembly of this type. It may occur in operation of this assembly that a part of the pressure fluid being pumped propagates as a so-called leakage fluid into a pump-sided crank chamber and from there through a gap between the pump housing and the motor housing into the interior of the motor. The pressure fluid which inadvertently entered the area of the rotor may cause short-circuits and, thus, malfunctions of the motor.

Therefore, an object of the present invention is to protect the electric motor of an electric-motor-and-pump assembly against the inadvertent ingress of leakage fluids in an inexpensive fashion. Another object of the present invention includes minimizing the overall axial dimensions of the assembly because small-size assemblies are preferred especially in the automotive field.

SUMMARY OF THE INVENTION

This object is achieved by the provision of a sealing element which closes the gap. Due to these features, the electric motor is protected against the ingress of leakage fluids in an especially reliable and inexpensive fashion. It must be emphasized that the sealing element permits mounting in a simple manner.

In a preferred aspect of the present invention, the sealing element is mounted on the housing lid and acts upon the motor shaft in a radial direction. The particularly small overall size is advantageous in this arrangement. Also, this embodiment is easy to achieve when a silicone seal is injection-molded in the associated groove of the housing lid during manufacture.

In a variant of the present invention, the sealing element is mounted on a frontal end of the housing lid and acts upon a bearing ring in an axial direction. This embodiment necessitates low efforts in manufacture because the sealing element bears against the bearing ring which is already in finished condition when supplied. This eliminates the need for a formerly required step in manufacture.

In another embodiment, the sealing element has an annular configuration with a V-shaped cross-section and is resiliently arranged in a space between an inner bearing ring and a stop ring. This type of construction can be adapted to most different cases of application and entails minimum effort and structure.

In an additional aspect of the present invention, the sealing element on a motor-sided frontal end is mounted in a groove of the housing lid and acts upon the commutator in an axial direction. The sealing effect is boosted by the effect of the preceding gap between the housing lid and motor shaft.

In still another embodiment, the sealing element with an annular basic member is inserted into the housing lid and acts upon the commutator with a deflected conical portion in an axial direction.

Further aspects of the present inventions can be seen in the description and the drawings. The present invention will be described in detail in the following by way of embodiments shown in the Figures.

DETAILED DESCRIPTION OF THE DRAWINGS

Figure 1:
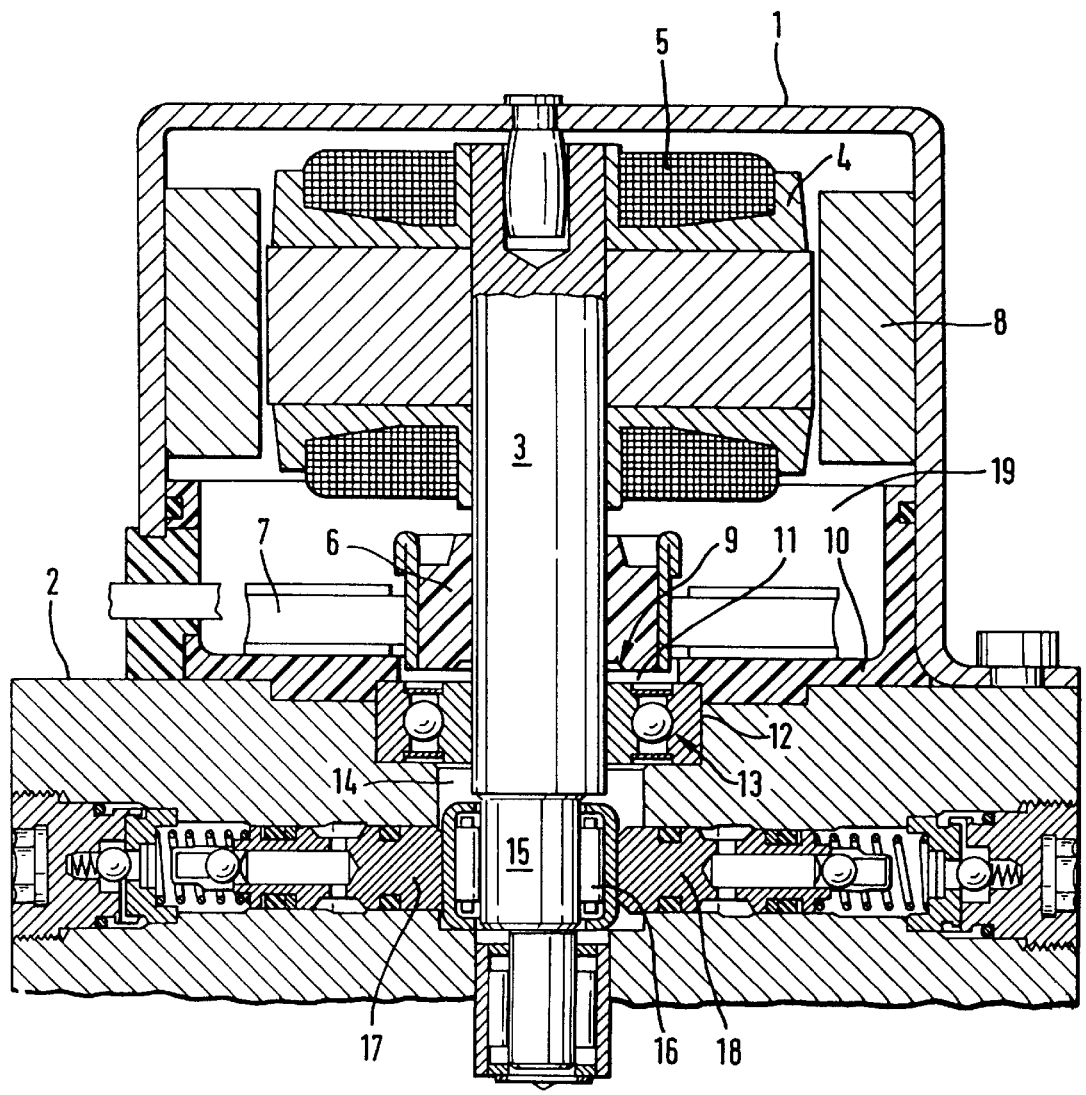
FIG. 1 is a cross-section taken through an electric-motor-and-pump assembly which is principally known in the art.

The embodiment of FIG. 1 shows a cross-section of a motor/pump assembly which is principally known in the art. The assembly comprises a motor housing 1 and a pump housing 2 which are attached to one another, for example, slipped into one another. The electric motor comprises a motor shaft 3 which projects from the motor housing 1 and extends into the pump housing 2. Further, the electric motor includes basically customary components such as armature 4, coils 5, collector 6, and brushes 7, interaction of which with permanent magnets 8 is basically known and requires no further explanations. The motor shaft 3 extends from the motor housing 1 and into the pump housing 2 proximate a shaft passage 9. A gap 11 is provided in the pump-sided housing lid 10 of the motor housing 1, thus permitting free rotation of the motor shaft.

Pump housing 2 accommodates a bore 12 which is stepped several times. A first bore step thereof is used as a mounting support of the motor shaft 3 by way of a roller bearing 13. Adjacent thereto in the pump housing 2 is a crank chamber 14 which provides the space for rotation of an eccentric 15 mounted on the motor shaft 3. Arranged on the periphery of the eccentric 15 is a needle bearing 16 which actuates pump pistons 17, 18 located vertically in relation to the pump shaft 3.

Leakage of the pump pistons 17, 18 occurs during operation of the assembly so that parts of the delivery fluid enter into the crank chamber 14 and, through the roller bearing 13 and the gap 11, into the inside space 19 of the motor. The fluid which entered the motor inside space 19, which is hydraulic oil mostly, causes short circuits and, thus, motor failures or other malfunctions or damages. The danger of short-circuits is particularly imminent in the illustrated assembly because carbon brushes 7 are incorporated in the housing lid 10 on the side remote from the pump. Hence, the brushes 7 are situated close to the shaft passage 9.

Figure 2:
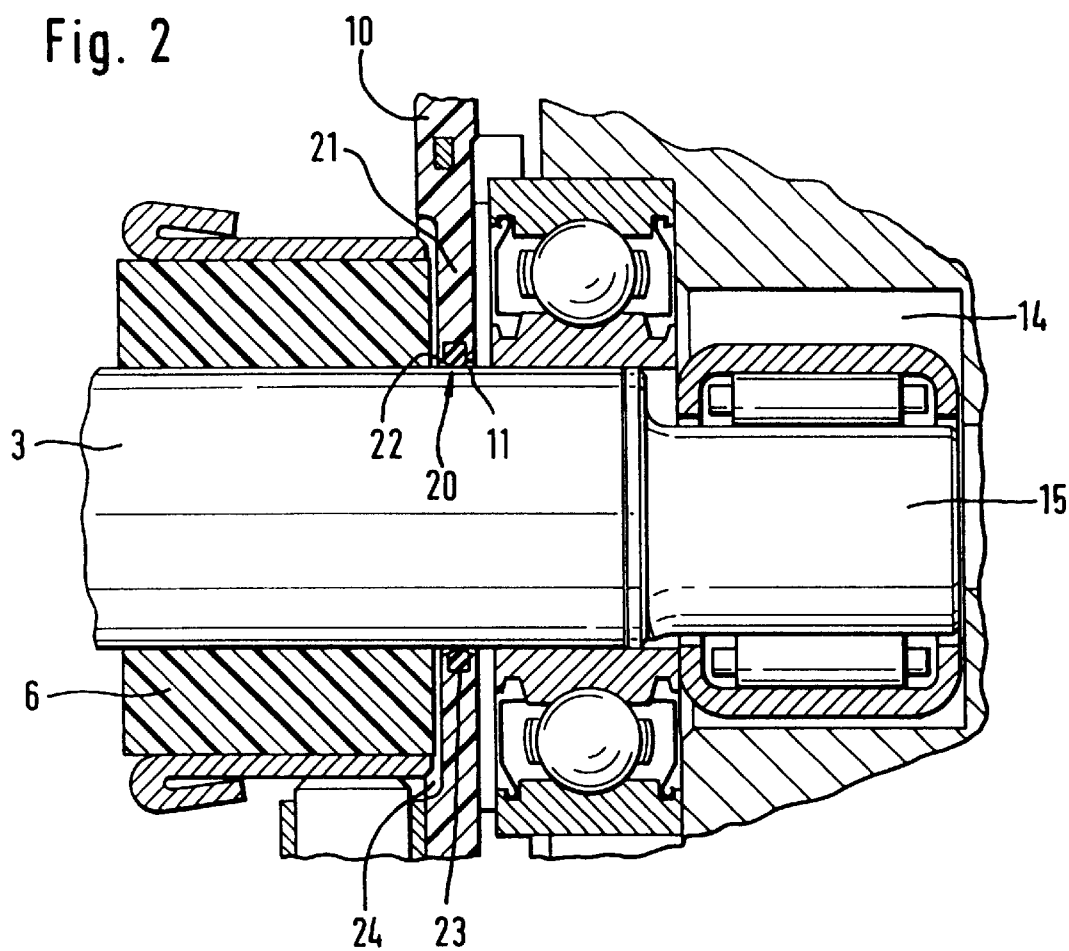
FIG. 2 is an enlarged view of a separated cross-section taken through an embodiment of the present invention with a radially acting sealing element.

For this reason, provision of at least one sealing element 20 proximate the shaft passage 9 is proposed which shuts off the gap 11 between t he motor inside space 19 and the crank chamber 14 and is mainly arranged on the housing lid 10. A sealing element 20 of this type can be seen in FIG. 2. In contrast to the FIG. 1 embodiment, the housing lid 10 with its wall 21 extends almost until the motor shaft 3 and includes a bore 22 with a small gap 11 to the motor shaft 3 for the shaft to pass through. Bore 22 has at its periphery a circumferential groove 23 in which a sealing element 20, preferably a sealing ring, is mounted and acts upon the motor shaft 3 radially. The sealing element 20 is made of an elastic material, for example, silicone plastics, which is injected into the groove 23 to reliably seal the gap 11 when the sealing lip of the sealing element 20 abuts on the motor shaft side. On the side of the collector, the housing lid 10 includes a recess 24 into which the collector 6 extends, at least partly. This arrangement has a particularly short overall axial length because the sealing element 20 is in alignment with the housing lid 10 and is smaller than the wall 21 and because at least one recess 24 is provided in the housing lid 10 into which the collector 6 is engaged at least in part. Of course, it is also possible to provide a recess on the pump side, into which an associated component, for example a bearing ring, is engaged. Thus, reliable sealing of the motor housing 1 is achieved with smallest possible dimensions of the assembly, even if the housing lid 10 accommodates the brushes 7 on the motor side, i.e., the brushes are located especially close to the shaft passage 9.

Figure 3:
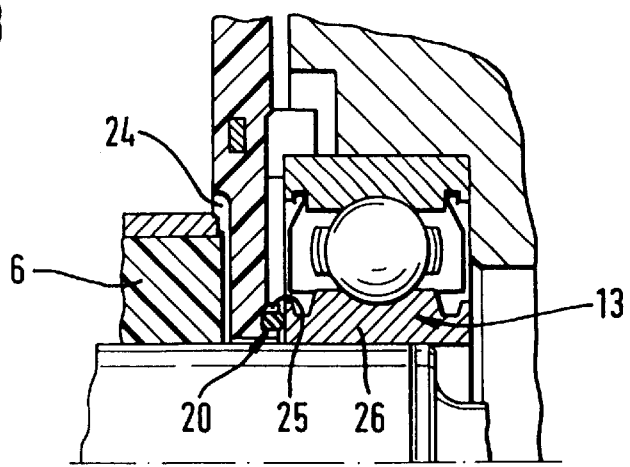
FIG. 3 is an enlarged view of a separated cross-section taken through a detail of another embodiment with an axially acting sealing element.

In a varied embodiment according to FIG. 3 which shows the sealing and bearing area in detail, the sealing element 20 is mounted in a cylindrical and annular projection 25 and acts upon a bearing ring 26, for example, an inner bearing ring of roller bearing 13. The flange-type projection 25 projects on the pump side axially in the direction of the bearing ring 26. Further, a recess 24 for the collector 6 is provided in this type of construction. A major advantage of this design is the possibility of mounting all components of the assembly in an axial direction, with the recess 24 resulting in a shortened overall length.

Figure 4:
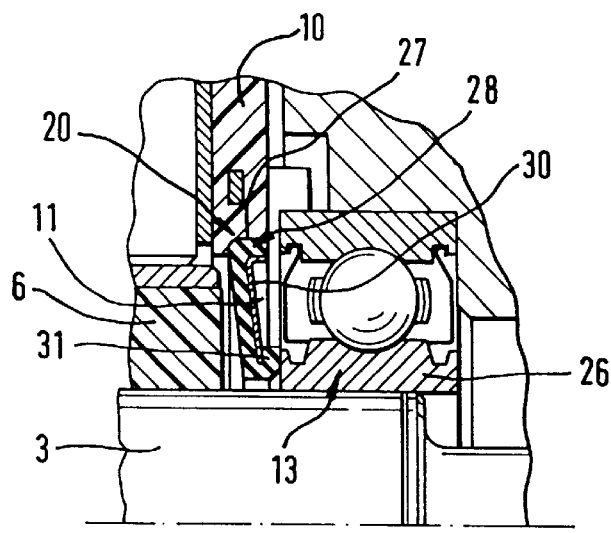
FIG. 4 is a cross-section, as in FIG. 3, taken through another embodiment.
Figure 5:
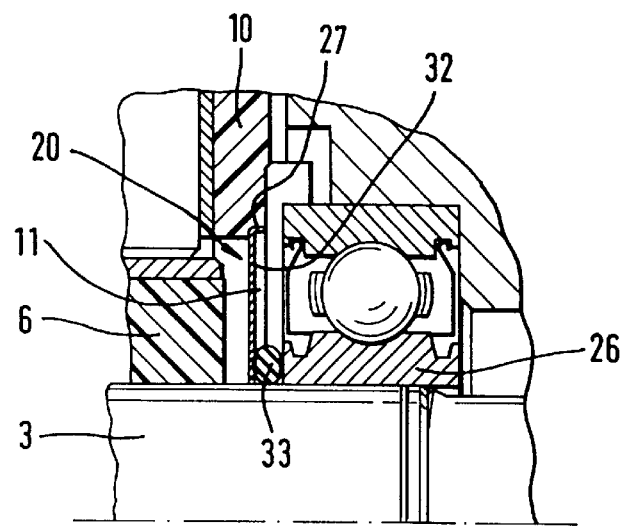
FIG. 5 is a cross-section, as in FIG. 3, taken through a fourth embodiment.
Figure 6:
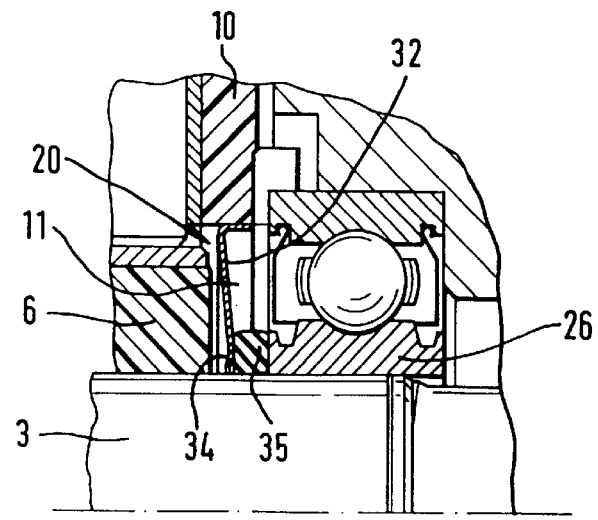
FIG. 6 is a cross-section, as in FIG. 3, taken through a fifth embodiment.

The housing lid 10 includes a stepped bore 27 close to the pump in a variant according to the FIG. 4 embodiment. A shaft sealing ring 28 with an annular reinforcing and resilient element 30 and an elastic sealing lip 31 is inserted into the stepped bore 27. The shaft sealing ring is seated on a bore step. The elastic sealing lip 31 acts upon the inner bearing ring of the roller bearing 13. A similar embodiment is shown in FIG. 5. In this embodiment, too, the sealing element 20 is inserted into a stepped bore 27 close to the pump. The sealing element 20 has a stop ring 32 which is inserted into the stepped bore 27, and an O-ring 33 which is squeezed between the stop ring 32 and the bearing ring 26 and, thus, closes the gap 11 between the housing lid 10 and the motor shaft 3. A similar embodiment is shown in FIG. 6. In contrast to FIG. 5, a through-bore is provided in the housing lid 10, and the stop ring 32 has a resilient design. Resilient end 34 acts upon a PTFE (polytetrafluorethylene) ring 35 which is urged against the bearing ring 26. It is an advantage that the PTFE ring 35 has particularly low friction values so that losses due to friction are minimal. To minimize friction, the inner bearing ring is acted upon in all embodiments because the effective lever arm becomes minimal with respect to the axis of the motor shaft 3.

Figure 7:
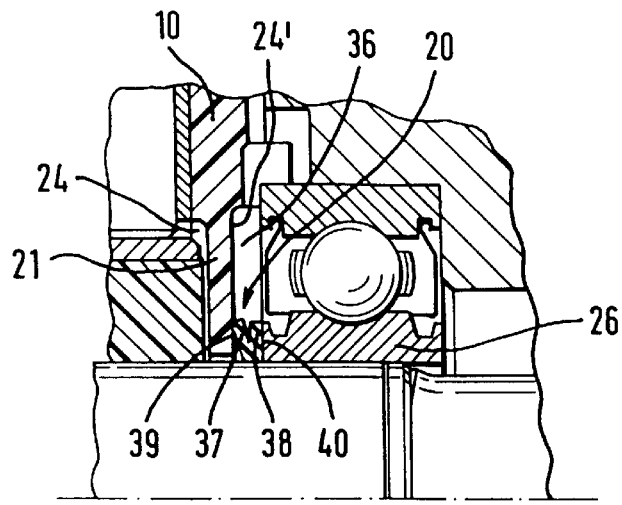
FIG. 7 is a cross-section, as in FIG. 3, with a sealing element configured as a V-shaped sealing ring in cross-section.

In the embodiment of FIG. 7, an intermediate chamber 36 is provided between the bearing ring 26 and the wall 21 of the housing lid 10. Chamber 36 houses an annular sealing element 20 with a V-shaped cross-section and resiliently acts upon the inner bearing ring and the housing lid 10. The two sealing lips 37, 38 bear against corresponding mating surfaces 39, 40, and a shaft-sided sealing portion of the sealing element 20 is seated on the shaft so that the sealing element 20 rotates along with the shaft. It is advantageous that following the sealing element 20 is the gap 11, which additionally enhances the sealing effect.

Figure 8:
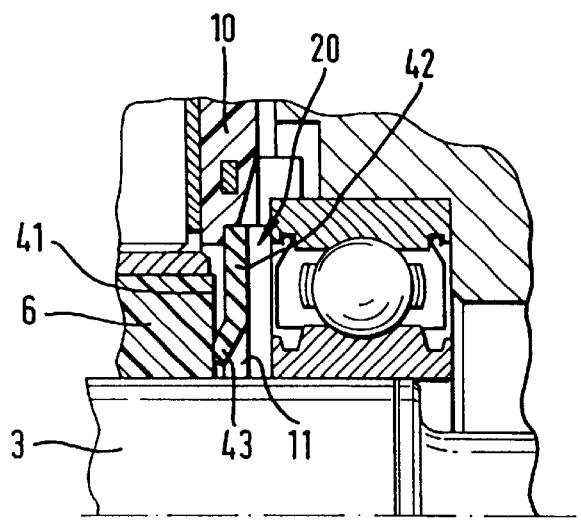
FIG. 8 is a cross-section, as in FIG. 3, with an axially acting sealing element that applies the commutator.
Figure 9:
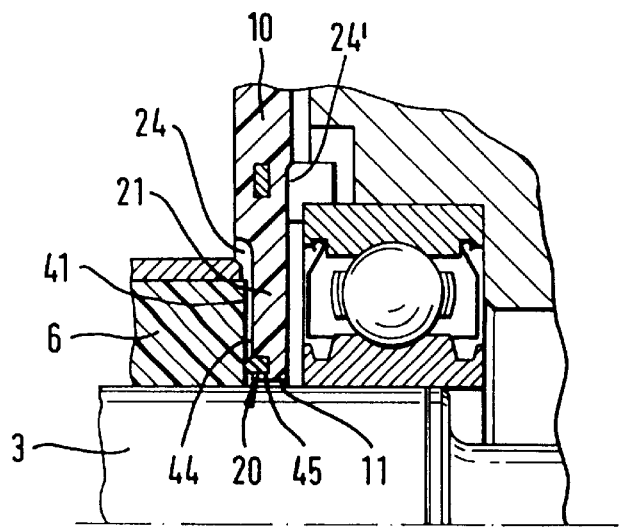
FIG. 9 is a cross-section, as in FIG. 3, with a variation of an axially acting sealing element that applies the commutator.

The embodiments of FIGS. 8 and 9 describe a different solution wherein one frontal end 41 of collector 6 is acted upon by the sealing element 20. According to FIG. 8, the sealing element 20 has an annular basic member 42 and a deflected conical portion 43 which acts upon the collector 6 in an axial direction. There is a comparatively large gap 11 between the housing lid 10 and the motor shaft 3. Compared thereto, the gap between the housing lid 10 and the motor shaft 3 in the solution according to FIG. 9 is minimized because the housing lid 10 with its wall 21 extends in a particularly close proximity to the motor shaft 3. The sealing element 20 is placed on a motor-sided frontal end 44 of the housing lid 10 in the interior of a groove 45 and acts upon the associated mating surface 38 of the collector 6 in an axial direction. Like in FIG. 7, the housing lid 10 includes recesses 24', 24 on both the pump side and the motor side, and the collector 6 engages at least partly into the recess 24 close to the motor.

It is to be understood that many differently configured embodiments of the present invention are possible without departing from the basic spirit of the invention.

What is claimed is:

1. An electric-motor-and-pump assembly including an electric motor having a pump-sided end of a motor shaft which extends through a housing lid and is supported with at least one roller bearing on a pump housing, and whose purpose is to drive pump pistons, wherein the housing lid in the area of a shaft passage leaves open a gap which connects a pump-sided crank chamber to an inside space of the motor, wherein a sealing element is provided and closes the gap.

2. An assembly as claimed in claim 1, wherein the sealing element is mounted on the housing lid and acts upon the housing shaft in a radial direction.

3. An assembly as claimed in claim 1, wherein the housing lid includes a bore which has a groove for the sealing.

4. An assembly as claimed in claim 1, wherein the housing lid extends along the motor shaft in order to produce a narrow gap along with a wall.

5. An assembly as claimed in claim 1, wherein the motor has a collector partly extending into a recess of the housing lid.

6. An assembly as claimed in claim 1, wherein the sealing element is mounted on a frontal end of the housing lid and acts upon a bearing ring in an axial direction.

7. An assembly as claimed in claim 6, wherein the housing lid has, in an axial direction, a cylindrical projection with a groove in which the sealing element is arranged.

8. An assembly as claimed in claim 6, wherein the sealing element acts upon an inner bearing ring.

9. An assembly as claimed in claim 1, wherein the sealing element is configured as a shaft sealing ring.

10. An assembly as claimed in claim 1, wherein the sealing element includes an annular reinforcing and resilient element and at least one elastic sealing lip.

11. An assembly as claimed in claim 1, wherein the sealing element is inserted into a stepped bore close to the pump.

12. An assembly as claimed in claim 1, wherein the sealing element includes a stop ring and an associated O-ring and is interposed between the housing lid and an inner bearing ring.

13. An assembly as claimed in claim 2, wherein the stop ring has a resilient design, and a PTFE ring is arranged on one resilient end.

14. An assembly as claimed in claim 1, wherein the sealing element has an annular configuration and a V-shaped cross-section and is arranged in a space between an inner bearing ring and a stop ring.

15. An assembly as claimed in claim 1, wherein the housing lid has a motor-sided with a groove, the motor has a collector, and the sealing element is mounted in the groove and acts upon the collector in an axial direction.

16. An assembly as claimed in claim 1, wherein the sealing element with an annular basic member is inserted into the housing lid and, with a deflected conical portion, acts upon the collector in an axial direction.

* * * * *